(12) United States Patent
Conway et al.

(10) Patent No.: US 11,808,327 B2
(45) Date of Patent: Nov. 7, 2023

(54) LINEAR ACTUATOR WITH AN INTEGRATED VARIABLE FREQUENCY DRIVE

(71) Applicant: Columbus McKinnon Corporation, Getzville, NY (US)

(72) Inventors: Matthew Conway, Monroe, NC (US); Jared B. Godbey, Meadowview, VA (US); Jason D. Wills, Rock Hill, SC (US); Daniel A. Mast, Jr., Rock Hill, SC (US)

(73) Assignee: Columbus McKinnon Corporation, Getzville, NY (US)

( * ) Notice: Subject to any disclaimer, the term of this patent is extended or adjusted under 35 U.S.C. 154(b) by 162 days.

(21) Appl. No.: 17/386,593

(22) Filed: Jul. 28, 2021

(65) Prior Publication Data
US 2023/0034422 A1    Feb. 2, 2023

(51) Int. Cl.
*F16H 25/20* (2006.01)
(52) U.S. Cl.
CPC ..... *F16H 25/20* (2013.01); *F16H 2025/2031* (2013.01); *F16H 2025/2081* (2013.01)
(58) Field of Classification Search
CPC ..... F16H 2025/2081; F16H 2025/2031; F16H 25/20
See application file for complete search history.

(56) References Cited

U.S. PATENT DOCUMENTS

| 2,476,584 | A | * | 7/1949 | Clark | B64C 13/24 |
| | | | | | 192/14 |
| 3,038,352 | A | * | 6/1962 | Murphy | H02K 7/06 |
| | | | | | 475/2 |
| 3,407,318 | A | * | 10/1968 | Korthaus | H02K 7/1125 |
| | | | | | 318/362 |
| 4,563,908 | A | * | 1/1986 | Shube | F16H 25/20 |
| | | | | | 475/5 |
| 4,790,201 | A | * | 12/1988 | Gheddo | F16H 25/20 |
| | | | | | 74/89.41 |
| 4,858,481 | A | * | 8/1989 | Abraham | H02K 11/25 |
| | | | | | 318/473 |
| 9,188,237 | B2 | | 11/2015 | Dolenti et al. | |
| 10,007,273 | B2 | | 6/2018 | Martino et al. | |

(Continued)

FOREIGN PATENT DOCUMENTS

JP     2020137187     8/2020

*Primary Examiner* — David M Fenstermacher
(74) *Attorney, Agent, or Firm* — Phillips Lytle LLP; David L. Principe

(57) ABSTRACT

A linear actuator with an integrated variable frequency drive. The linear actuator includes an AC motor. A screw assembly with an output shaft is mechanically coupled to the AC motor. An extension tube is provided with a front mount. The extension tube is configured and arranged to be driven in translatory motion in either direction by the screw assembly. A cover tube encloses the extension tube and screw assembly. An actuator housing is operatively associated with the screw assembly and the AC motor. The actuator housing has a removable cover. A bracket is attached to the inside surface of the removable cover. The VFD is mounted within the actuator housing. The VFD may be mounted on the bracket adjacent to the inside surface of the removable cover. The removable cover may facilitate heat transfer out of the actuator housing.

2 Claims, 5 Drawing Sheets

(56) References Cited

U.S. PATENT DOCUMENTS

| | | | |
|---|---|---|---|
| 11,444,511 B2* | 9/2022 | Morisaki | B06B 1/045 |
| 2011/0187214 A1* | 8/2011 | Jan | F16H 25/2015 |
| | | | 310/73 |
| 2015/0345134 A1* | 12/2015 | Takahashi | F16F 15/027 |
| | | | 52/167.2 |
| 2019/0061806 A1* | 2/2019 | Yamaguchi | F16H 25/2204 |
| 2021/0276850 A1* | 9/2021 | Lombardo | B66F 11/044 |

* cited by examiner

LINEAR ACTUATOR WITH AN INTEGRATED VARIABLE FREQUENCY DRIVE

TECHNICAL FIELD

The present invention relates generally to the field of actuators, and more particularly to a linear actuator with an integrated variable frequency drive.

BACKGROUND ART

U.S. Pat. No. 10,007,273 B2 discloses an actuator configured to adjust the position of a choke valve, and the patent also discloses a variable frequency drive configured to adjust a speed at which the actuator adjusts the position of the choke valve. U.S. Pat. No. 9,188,237 discloses a variable speed motor and a motor controller which may consist of a variable frequency drive ("VFD"). The motor may be coupled directly to a valve or may be coupled to an actuator gear box (rotational or linear output), which in turn, may be coupled to the valve or other driven load.

BRIEF SUMMARY OF THE INVENTION

With parenthetical reference to the corresponding parts, portions or surfaces of the disclosed embodiment, merely for the purposes of illustration and not by way of limitation, the present invention provides a linear actuator (10) with an integrated variable frequency drive ("VFD") 61. The linear actuator (10) includes an AC motor (13). A screw assembly (46) with an output shaft (43) is mechanically coupled to the AC motor (13). An extension tube (16) is provided with a front mount (19). The extension tube (16) is configured and arranged to be driven in translatory motion in either direction by the screw assembly (46). A cover tube (22) encloses the extension tube (16) and screw assembly (46). An actuator housing (31) is operatively associated with the screw assembly (46) and the AC motor (13). The actuator housing (31) has a removable cover (28). A bracket (73) is attached to the inside surface (70) of the removable cover (28). The VFD (61) is mounted on the bracket (73) adjacent to the inside surface (70) of the removable cover (28) to facilitate heat transfer out of the actuator housing (31) through the removable cover (28).

In another aspect, the actuator (10) further comprises one or more gears (40) configured and arranged to reduce the speed of an input shaft (37) on the AC motor (13).

In another aspect, a gearbox (34) encloses the one or more gears (40).

In another aspect, the actuator housing (31) is mounted on the gearbox (34).

In yet another aspect, the removable cover (28) has a plurality of cooling fins (64) disposed on an outer surface (67) thereof.

The linear actuator (10) may include a position sensor (55) located inside the actuator housing (31) and configured and arranged to detect the position of the output shaft (43).

The linear actuator (10) may include a rear mount assembly (25) extending from the outside surface (64) of the removable cover (28).

The linear actuator (10) may include a U-shaped mounting bracket (73).

In another aspect at least a portion (79, 80) of the mounting bracket (73) extends substantially perpendicular to the inside surface (70) of the removable cover (28).

In another aspect the mounting bracket (73) is removably attached to the inside surface (70) of the removable cover (28).

In another aspect the variable frequency drive (61) is disposed in spaced apart relation to the inside surface (70) of the removable cover (28) when the variable frequency drive (61) is mounted on the bracket (73).

In another aspect the mounting bracket (73) is L-shaped.

In another aspect the removable cover (28) extends from the top to the bottom of the actuator housing (31).

In another aspect the rear mount assembly (25) is removably attached to the rear cover (28).

In another aspect the rear mount assembly (25) is integrally formed on the removable cover (28).

In another aspect a portion (79, 80) of the mounting bracket (73) extends substantially perpendicular to the inside surface (70) of the removable cover (28) at a midportion of the actuator housing (31).

The linear actuator (10) may further comprise limit switches operatively associated with the screw assembly (46).

In another aspect the position sensor (55) may comprise one of an encoder and a potentiometer. Other position sensors may also be suitable as will be evident to persons of ordinary skill in the art based on this disclosure.

The linear actuator (10) may further comprise analog and digital outputs configured for one of actuator control, position feedback, synchronization, condition monitoring and setting adjustments.

In yet another aspect the linear actuator (10) is configured and arranged to be synchronized with multiple actuators.

DESCRIPTION OF THE PREFERRED EMBODIMENTS

Figure 1:
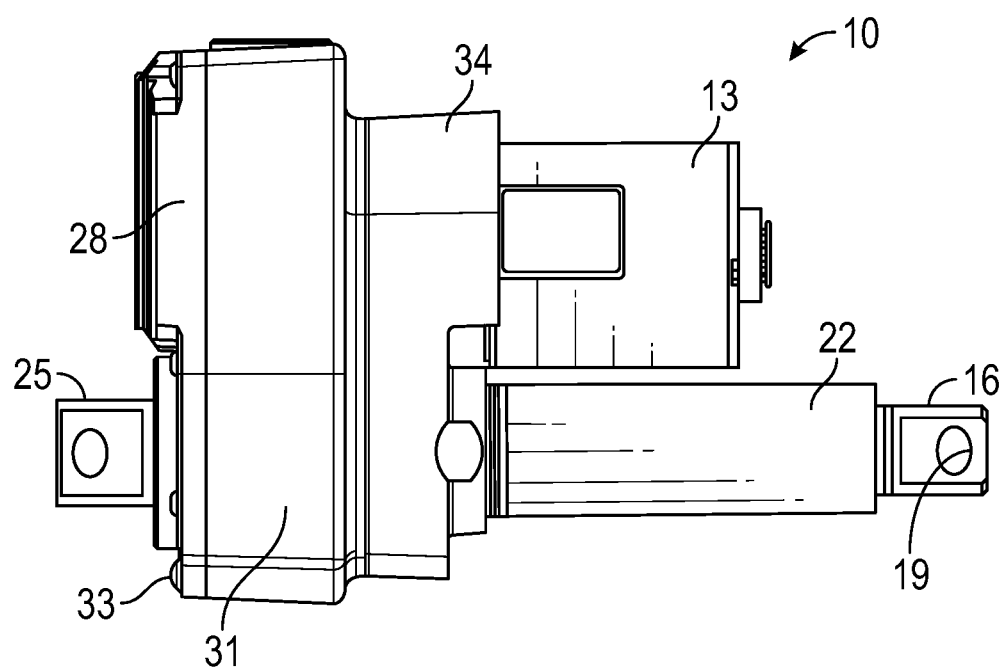
FIG. 1 is a side elevational view of a first embodiment of the linear actuator of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, this invention provides a linear actuator 10 having an AC motor 13 mechanically coupled to an extension tube 16 which may have a front mount 19 disposed thereon. The extension tube 16 is surrounded by a cover tube 22. A rear mount 25 may be disposed on a removable cover 28 that attaches to an actuator housing 31 for example by means of fasteners 33. The actuator 10 may also be provided with a gearbox 34.

Figure 2:
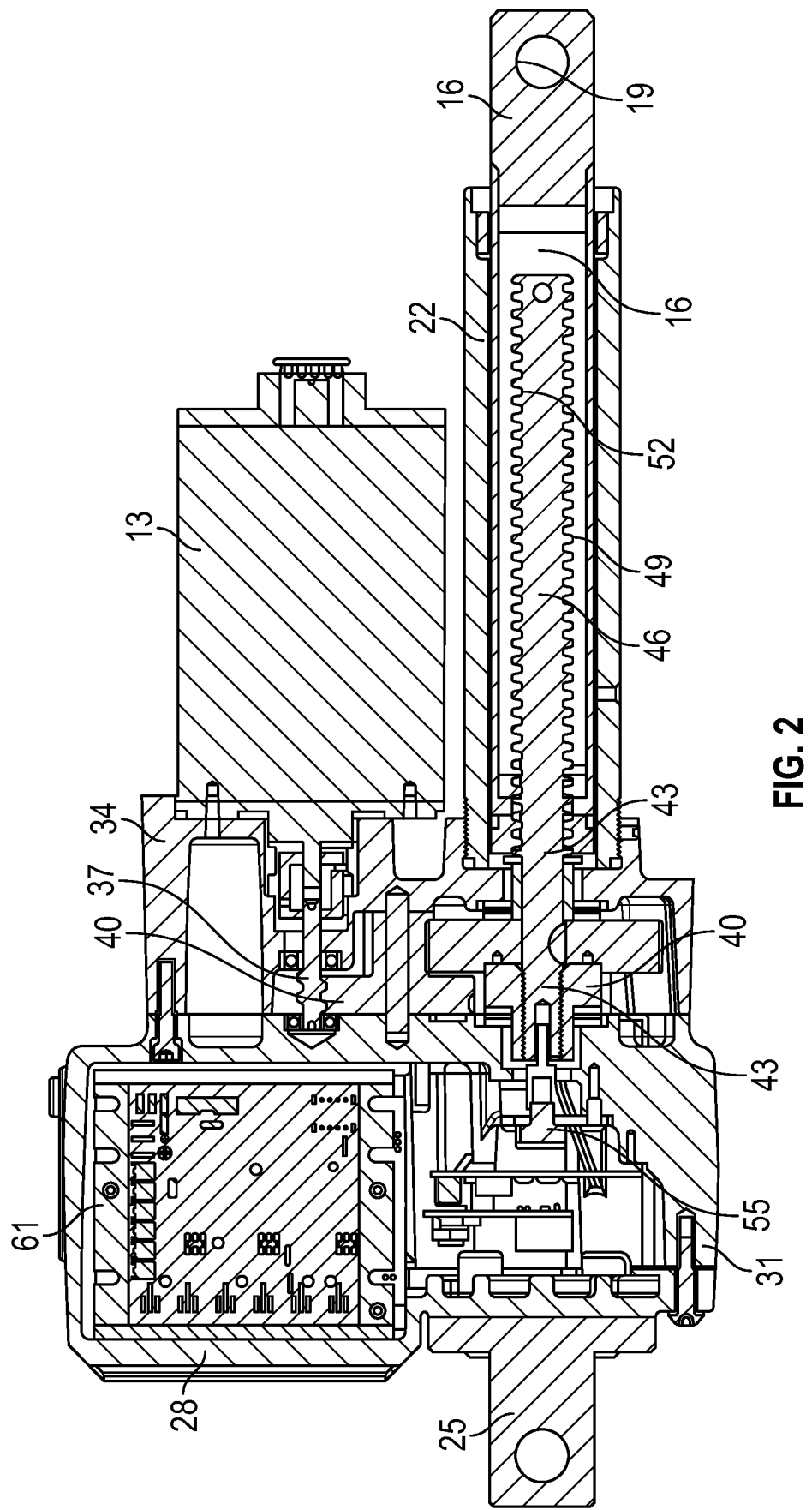
FIG. 2 is a cross-sectional side elevation view of an embodiment of the linear actuator.

Turning to FIG. 2, the AC motor 13 may be provided with an input shaft 37. The input shaft 37 may be connected to one or more gears 40 to reduce the speed of the input shaft 37. The one or more gears 40 may be disposed inside the gearbox 34. The one or more gears 40 are configured and arranged to mate with gears coupled to an output shaft 43 of a screw assembly 46. Alternatively, the actuator 10 may comprise a direct drive system without pars 40.

The screw assembly 46 may be formed integrally with the output shaft 43 and includes a plurality of screw flights 49. Rotation of the shaft 43 causes rotation of the screw flights 49. The extension tube 16 has internal grooves 52 that engage with the flights 49 on the screw assembly 46 such that rotation of the output shaft 43 results in translatory motion of the extension tube 16 from left to right and right to left with respect to the orientation of FIG. 2.

The actuator 10 may be provided with a position sensor 55 disposed in the actuator housing 31. The position sensor 55 may be configured and arranged to detect the position of the output shaft 43. The position sensor 55 may include an encoder or potentiometer for position feedback. The actuator 10 may also be provided with one or more limit switches to define the travel for the extension tube 16. The limit switches may be mechanical or electronic limit switches based on feedback from the position sensor 55.

In the upper portion of the actuator housing 31 in FIG. 2, a dedicated variable frequency drive ("VFD") 61 is located near the AC motor 13. The VFD 61 provides control signals to control the speed of the AC motor 13 as will be evident to those of ordinary skill in the art based on this disclosure.

Location of the VFD 61 in the actuator housing 31 proximate to the motor 13 provides many advantages. The design reduces the space and installation complexity related to external control panels. The combination of the control's algorithm, electronic limit switches, and the VFD 61 enable increased positioning accuracy for the extension tube 16. Also, the system provides soft starting and ramp up acceleration that reduces the shock load and thereby increases the life expectancy of the motor 13 and the entire gear train.

The VFD 61 can be used to automatically adjust the speed of the actuator 10 in order to move the actuator 10 more quickly under light or no-load conditions. The duty cycle for the system may be increased from 25% to >50% by eliminating high inrush currents. The end user can adjust the speed of the actuator from 30% to 200%.

Figure 3:
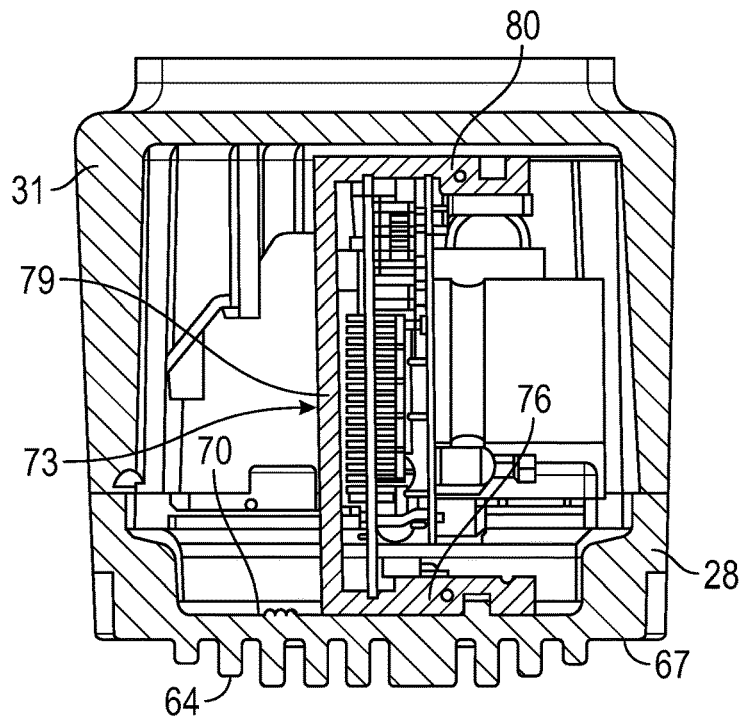
FIG. 3 is a cross-sectional top view of the actuator housing.

In FIG. 3, a top view shows the removable cover 28 and the actuator housing 31. The cover 28 may be provided with a plurality of cooling fins 64 disposed on an exterior surface 67 of the cover 28. The cover 28 has an inside surface 70. A bracket 73 may be mounted on the inside surface 70 of the removable cover 28. The bracket 73 may be U-shaped or L-shaped. A portion 76 of the bracket 73 may be disposed substantially parallel to the inside surface 70 and a portion 79 of the bracket 73 may be disposed substantially perpendicular to the inside surface 70 of the cover 28. The portion 79 extends inward from the cover 28 to an internal space defined by the actuator housing 31. A portion 80 of the bracket 73 also may extend substantially parallel to portion 76 and perpendicular to the inside surface 70.

Figure 4:
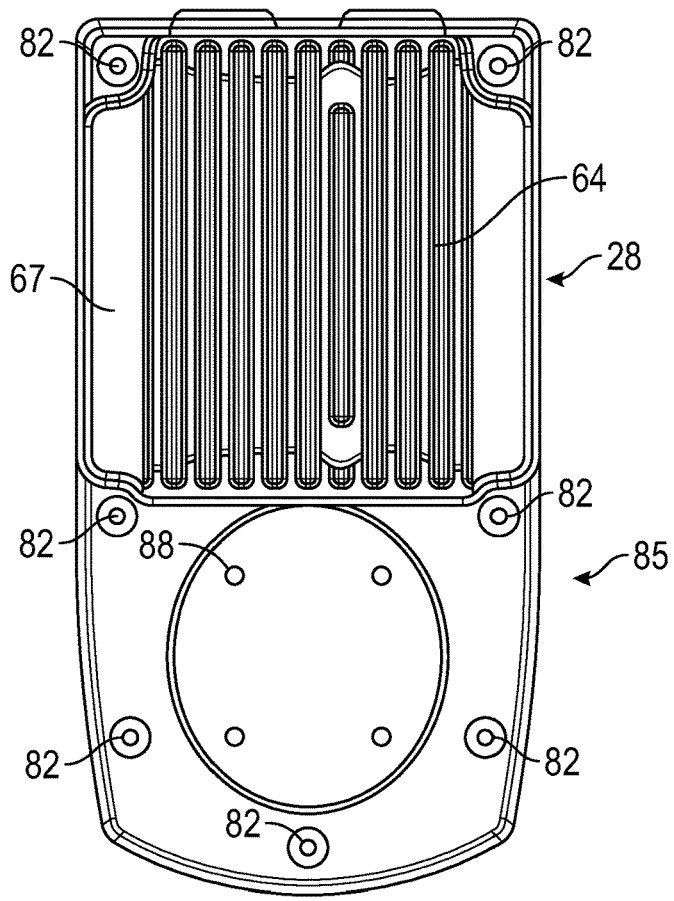
FIG. 4 is an elevational view of the removable cover of the present invention.

In FIG. 4, the cover 28 may be removably attached to the actuator housing 31 by a plurality of fasteners 82. The cooling fins 64 may be disposed on the exterior surface 67 in a vertically extending and substantially parallel arrangement. The fins 64 may have a rounded surface and may extend vertically in a continuous length. As shown in FIG. 3, the fins 64 may have varying widths and heights. Alternatively, the fins 64 may have uniform dimensions. The bottom portion 85 of the cover 28 may be provided with openings 88 for attaching a rear mount 25 (shown in FIGS. 1 and 2). The rear mount 25 shown is a clevis style. Alternatively, the actuator 10 may be provided with a Trunnion mount that may provide for side mounting of the actuator 10.

Figure 5:
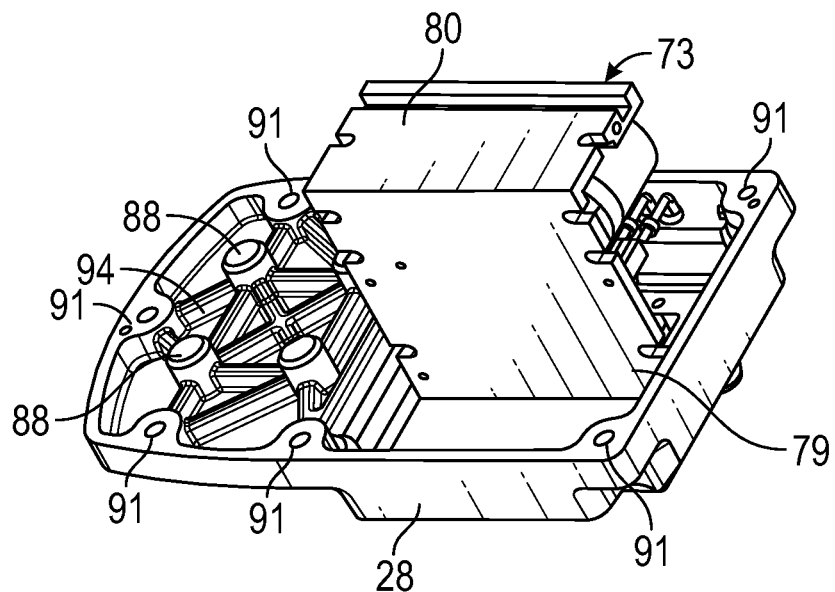
FIG. 5 is a perspective view of the removable cover with a bracket installed thereon.

Referring generally to FIGS. 5-8, and initially to FIG. 5, the cover 28 may be provided with a plurality of openings 91 configured and arranged to receive fasteners 82 (FIG. 4) for attaching the cover 28 to the actuator housing 31. The cover 28 may also include openings 88 for attaching the rear mount 25. The cover 28 may be reinforced by a plurality of elongate ribs 94 disposed between the openings 88 and 91. The bracket 73 supporting the VFD 61 may extend for a portion 79 substantially perpendicular to the inside surface 70 of the cover 28. A second distal portion 80 of the bracket 73 may extend substantially parallel to the inside surface 70.

Figure 6:
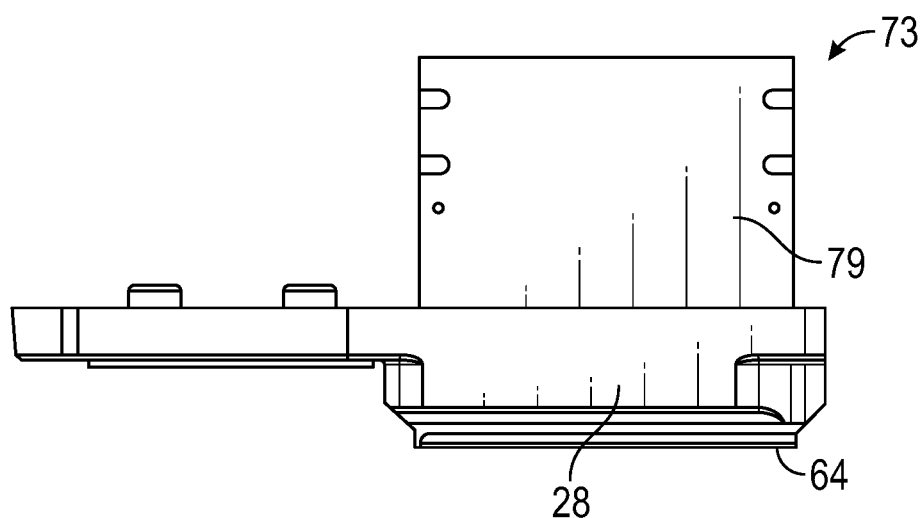
FIG. 6 is an elevational view of the removable cover with a bracket.

In FIG. 6, the bracket 73 extends inward from the inside surface 70 of the cover 28 such that the VFD 61 is disposed inside a space formed by the actuator housing 31 when the cover 28 is attached to the actuator housing 31. The VFD 61 is mounted to the internal surface 70 of the cover 28 to facilitate efficient heat transfer out of the enclosure formed by the cover 28 and the housing 31. The plurality of cooling fins 64 are disposed on the side of the cover 28 opposite from the bracket 73 to provide additional heat transfer. The VFD 61 may be removed and replaced by removing the cover 28 from the actuator housing 31. Accordingly, the VFD 61 is designed to be easily replaced via the access cover 28 that may attach to the rear of the housing 31. This configuration provides for extending the life of the actuator 10 if the VFD 61 happened to fail first.

Figure 7:
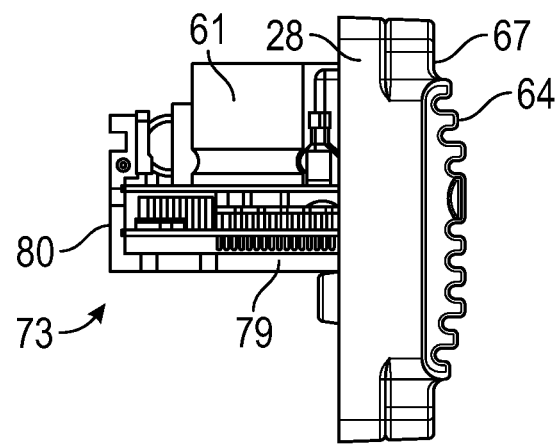
FIG. 7 is a side elevational view of the removable cover with a bracket'supporting a variable frequency drive.

Turning to FIG. 7, the bracket 73 is shown extending inward from the inside surface 70 of the cover 28. The outside surface 67 of the cover 73 may be provided with cooling fins 64 that may be formed in rows along an arc as shown in the figure.

Figure 8:
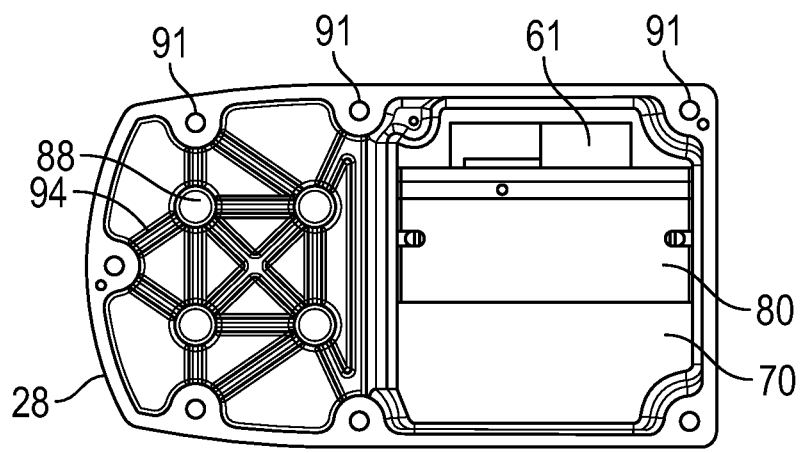
FIG. 8 is a plan view of the inside of the removable cover.

In FIG. 8, the reinforcing support members 94 are shown in greater detail. The support members 94 may be elongate and configured and arranged such that they connect between the openings 88 and 91.

The present invention contemplates that many changes and modifications may be made. Therefore, while the presently-preferred form of the linear actuator has been shown and described, and several modifications and alternatives discussed, persons skilled in this art will readily appreciate that various additional changes and modifications may be made without departing from the spirit of the invention, as defined and differentiated by the following claims.

The invention claimed is:
1. A linear actuator system comprising:
an AC motor;

a screw assembly with an output shaft, the screw assembly mechanically coupled to the AC motor;

an extension tube with a front mount, the extension tube configured and arranged to be driven in translatory motion in either direction by the screw assembly;

a cover tube enclosing the extension tube and screw assembly;

an actuator housing operatively associated with the screw assembly and the AC motor, the actuator housing having a removable cover; and, a variable frequency drive mounted within the actuator housing, wherein the variable frequency drive is disposed in spaced apart relation to the inside surface of the removable cover when the variable frequency drive is mounted on the removable cover.

2. A linear actuator system comprising:

an AC motor having an input shaft;

one or more gears configured and arranged to reduce the speed of the input shaft;

a gearbox enclosing the one or more gears;

a screw assembly with an output shaft mechanically coupled to the one or more gears;

an extension tube with a front mount, the extension tube configured and arranged to be driven in translatory motion in either direction by the screw assembly;

a cover tube enclosing the extension tube and screw assembly;

an actuator housing operatively associated with the screw assembly and the AC motor, the actuator housing having a removable cover; and, a variable frequency drive mounted on the removable cover to facilitate heat transfer out of the actuator housing through the removable cover, wherein the linear actuator is configured and arranged to be synchronized with multiple actuators.

* * * * *